United States Patent [19]

Chubb

[11] 4,119,556

[45] Oct. 10, 1978

[54] THERMAL ENERGY STORAGE MATERIAL COMPRISING MIXTURES OF SODIUM, POTASSIUM AND MAGNESIUM CHLORIDES

[76] Inventor: Talbot A. Chubb, 5023 N. 38th St., Arlington, Va. 22207

[21] Appl. No.: 802,395

[22] Filed: Jun. 1, 1977

[51] Int. Cl.² ............................................. C09K 5/06
[52] U.S. Cl. ..................................... 252/70; 126/400; 165/104 S
[58] Field of Search ..................... 252/70, 71; 126/400; 165/104 S; 148/15

[56] References Cited

U.S. PATENT DOCUMENTS

| | | | |
|---|---|---|---|
| 1,915,018 | 6/1933 | Ehrhardt | 252/70 |
| 1,984,369 | 12/1934 | Gensch | 252/71 |
| 2,158,854 | 5/1939 | Drake | 252/71 |
| 3,328,642 | 6/1967 | Haumesser et al. | 165/104 S X |
| 3,605,720 | 9/1971 | Mayo | 126/400 X |
| 3,741,900 | 6/1973 | Murtaugh et al. | 252/70 |
| 3,958,101 | 5/1976 | Barabas | 252/70 |
| 3,997,001 | 12/1976 | Chubb | 126/400 X |
| 4,008,758 | 2/1977 | Chubb | 126/400 X |
| 4,037,579 | 7/1977 | Chubb | 126/400 |

OTHER PUBLICATIONS

"Ternary Systems of Potassium Chloride, Sodium Chloride, and the Chlorides of Bivalent Metals," Scholich, Newes Jahrb. Min. Geol. Beil. Bd. 43,251–43,294 (1920), CA 15:2378.

Primary Examiner—Harris A. Pitlick
Attorney, Agent, or Firm—R. S. Sciascia; Philip Schneider; Thomas McDonnell

[57] ABSTRACT

Storage of thermal energy in a ternary mixture of salts which comprises from 22.5 to 26.5 weight percent of sodium chloride, from 18.5 to 22.5 weight percent of potassium chloride and from 53.0 to 57.0 weight percent of magnesium chloride.

4 Claims, 2 Drawing Figures

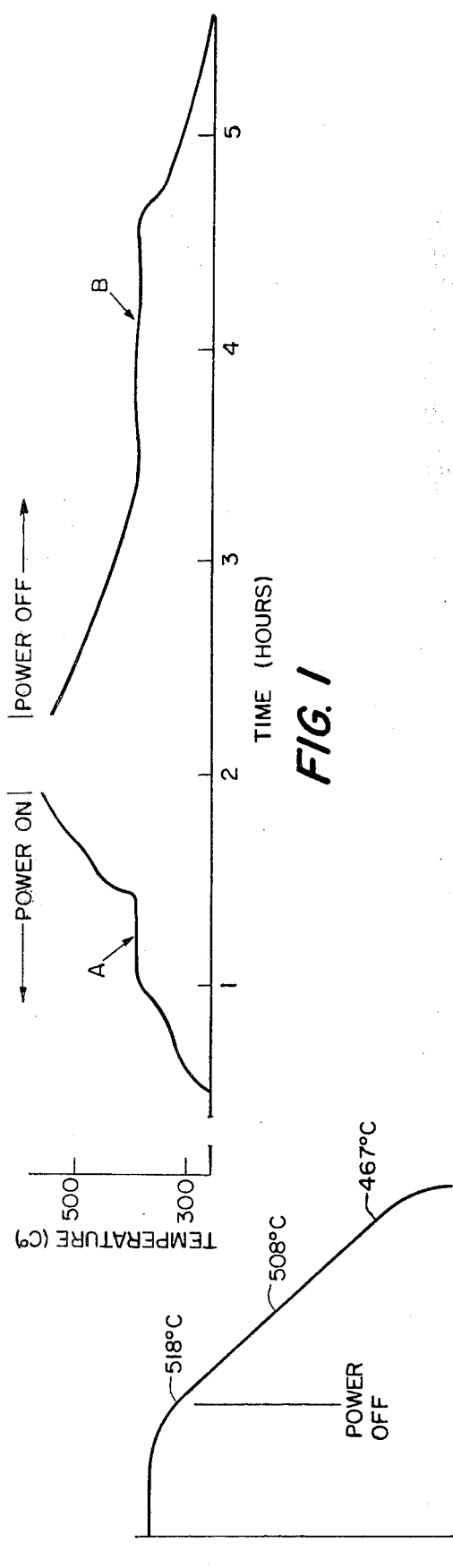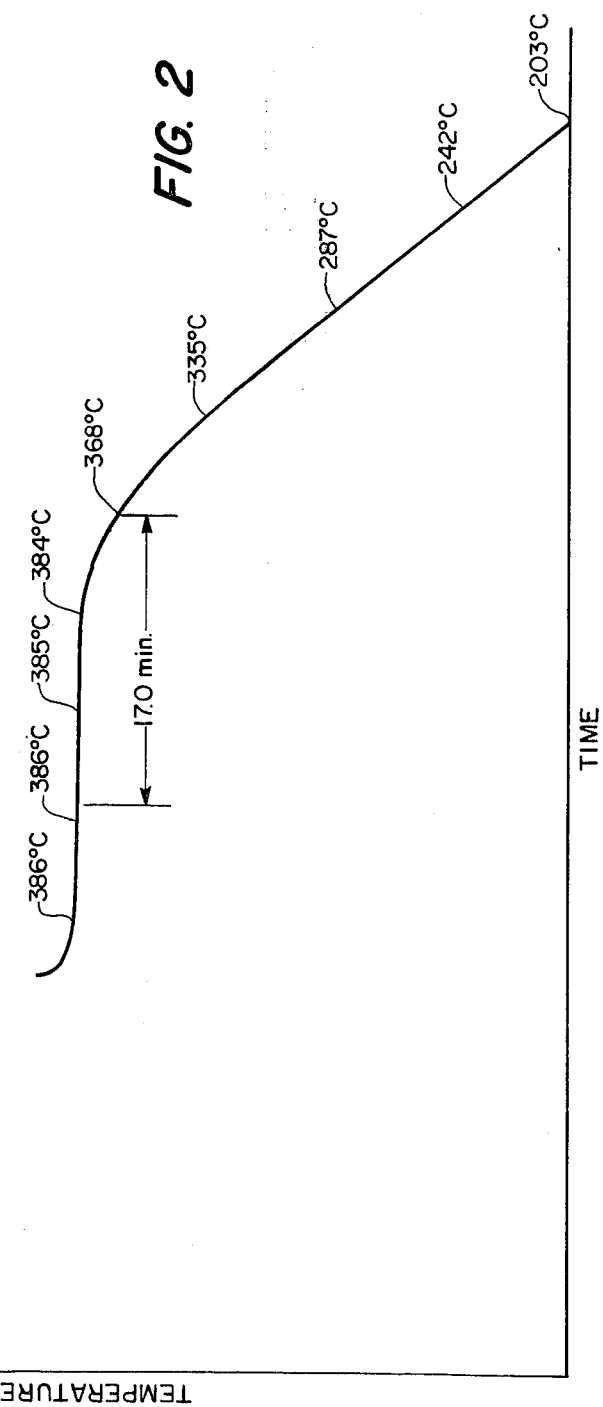

THERMAL ENERGY STORAGE MATERIAL COMPRISING MIXTURES OF SODIUM, POTASSIUM AND MAGNESIUM CHLORIDES

BACKGROUND OF THE INVENTION

This invention pertains generally to the storage of thermal energy and in particular to such storage as latent heat of fusion in a ternary eutectic salt mixture.

Storage of thermal energy has gained great importance since the increased interest in the use of solar energy. On account of the fluctuation in electrical usage and the limited availability of the sun during a 24 hour period, a practical solar energy collector requires a large-scale, demand-sensitive energy storage. Otherwise, the solar power system must be connected to an electrical power grid, which accomodates the changing input by means of peaking units. Such units are usually fast response, fuel-fired power generators that are generally of lower efficiency than base-load units.

One approach to large scale, demand-responsive storage proceeds by introducing thermal energy into one or more quantities of a thermal energy storage material by means of an energy transfer medium. In operation, a system utilizing this approach has hot fluid passing through pipes which are submerged in a liquid energy-transfer medium. The medium boils and the vapors are condensed on the sides of the one or more containers filled with a thermal energy-storage material. The heat of condensation causes the storage material to melt, thereby storing the thermal energy in the molten storage material.

Presently several techniques are known for providing large scale demand-responsive energy storage. Most of these techniques are not suited for regional energy production, but rather for a few buildings at best. A technique suited for regional energy production employs a mixture of hydroxides. The disadvantages of using hydroxides are that these compounds are corrosive and dangerous and do not occur naturally. Another technique which is promising for regional energy production utilizes mixtures of carbonates. Carbonates unfortunately have a melting point too high to be compatible with almost all organic heat transfer media. For a material to be acceptable for thermal energy storage, the melting temperature can be neither too high (e.g., carbonates) nor to low. If the melting point is too low, high-pressure super-heated steam cannot be used and the efficiency of the whole system is low. An example of a thermal energy storage material having a melting temperature which is too low is clathrates. It is also important the storage material is reasonably priced and available. Fluoride compounds fail these requirements. Although some of these compounds have excellent properties, these fluorides, like all fluorides are expensive.

SUMMARY OF THE INVENTION

It is therefore an object of this invention to store thermal energy in an abundant and cheap material which requires no chemical processing other than drying and melting.

Another object is to store thermal energy in a material having a melting point low enough for an organic heat transfer medium to be used but higher than the critical temperature of water.

A further object is to provide a thermal-energy storage material with a very limited tendency to supercool and with sharp melting freezing points.

A still further object is to provide a thermal-energy storage which has corrosion-compatibility with inexpensive container materials and is non-oxidizing.

These and other objects are achieved with a ternary salt mixture which comprises from 22.5 to 26.5 weight percent of sodium chloride, from 18.5 to 22.5 weight percent potassium chloride and from 53.0 to 57.0 weight percent of magnesium chloride.

BRIEF DESCRIPTION OF THE DRAWINGS

The invention is described in detail in the following description with reference to examples and the accompanying drawings, in which:

FIG. 1 is a graph showing the temperature of a salt composition encompassed by this invention as a function of time.

FIG. 2 is a graph showing the data from the experimental measurement of the heat of fusion for a salt composition within the limits of this invention.

DETAILED DESCRIPTION OF THE INVENTION

The thermal energy storage material of this invention is prepared by mixing sodium chloride, potassium chloride, and magnesium chloride in eutectic proportions. While the precise eutectic composition is most desirable because of the maximization of effectiveness of the salt mixture, an excellent energy-storage material is obtained from a salt mixture comprising from 22.5 to 26.5 weight percent of sodium chloride, from 18.5 to 22.5 weight percent of potassium chloride and from 53.0 to 57.0 weight percent of magnesium chloride.

Small quantities of one or more additional salts referred to as additive salts may be added to the salt mixture. These additive salts lower the melting point slightly, e.g., a small addition of a sulfate salt lowers the melting point from 385° C. to 380° C. The preferred salts are calcium, barium, or strontium chloride; sodium, potassium, or magnesium bromide, fluoride, or sulfate. The amount of these salts may be as high as 10 weight percent of the total composition.

The salts are at least 90 percent pure with no impurities which react with the chlorides, e.g., chromium oxide ($CrO_3$) or vanadium pentoxide ($V_2O_5$). If additive salts are to be mixed with the ternary salt mixture, then it is preferred that the purity of the salts of the present invention be such that the final mixture comprises at least 90 weight percent of sodium chloride, potassium chloride, and magnesium chloride. Larger amounts of impurities would diminish the effectiveness of the salts. In order to minimize any corrosion problem, water and hydrogen chloride are expelled from the mixture. An excellent method for eliminating water and hydrogen chloride involves an initial melting and cooling of the salt mixture. While melted, the remaining hydrogen chloride or water is eliminated by the inclusion of strips of an active metal, e.g., aluminum in the melting salt mixture. The hydrogen chloride or water attacks the metal when the temperature is raised above 500° C. The attack generally continues for several hours and is evidenced by an evolution of gas. When gas is no longer given off, the salt mixture is free of those two impurities.

Preferably, the salt mixture meets the following specifications. It has a melting point from 385° C. to 393° C. It is judged sufficiently dry by test such that an immersion of magnesium metal in a melt of the salt at a temperature in excess of 455° C. results in a gas generation rate not exceeding $1.6 \times 10^{-5} m^3 s^{-1}$ per $m^2$ of magnesium surface. Further, the solid mixture dissolves in water producing an insoluble residue not exceeding 9% of the mass of the solid placed in the water.

The thermal-energy storage material of this invention may be used in any type of hot-gas engine, such as one using a polyatomic gas in a closed cycle circulation system having a conventional steam turbine. One system is described in Chubb, T.A., *"Analysis of Gas Dissociation Solar Thermal Power System"*, in Solar Energy, 17 (2-D): p. 129–36, 1975; in U.S. Pat. No. 3,972,183 of T.A. Chubb; and in U.S. Pat. No. 3,997,001 of T.A. Chubb. All three above references are incorporated herein by reference. Briefly,, energy is stored and released in the above systems in the following manner. The salt mixture is packaged in an assemblage of small, partially filled metal containers mounted on racks inside an airtight tank. During the daytime, energy is introduced to the tank by "heat release" pipes at the bottom of the tank. This energy is derived from a chemical reaction $\frac{1}{2} O_2 + SO_2 \rightarrow SO_3$ that occurs as the gas stream from a solar collection field passes over a catalyst bed contained in the pipes. The heat release pipes are embedded in a pool of m-terphenyl liquid. Energy input causes the terphenyl to boil and increases its vapor pressure within the tank resulting in condensation on the outside surfaces of the salt cans. The heat-of-condensation of terphenyl causes the salt within the cans to melt.

During the night when energy is no longer being supplied to the heat-release piping, the pool of liquid at the bottom of the tank cools so that the salt cans become the hottest portion of the tank assembly. The sides of the cans are continuously wetted with liquid terphenyl supplied by a pump and spray system. The surface film evaporates, cooling the salt and maintaining a high vapor pressure of terphenyl within the tank. Energy is withdrawn from the tank by introducing water into steam generator lines at the top. Condensation of terphenyl vapor on the steam lines delivers heat to the steam generator lines, boiling the introduced water and superheating the resultant steam.

Having generally described the invention, the following examples are given for purposes of illustration. It is to be understood that the invention is not limited to these examples, but is susceptible to different modifications that would be recognized by one of ordinary skill in the art.

EXAMPLE I

Chloride salts which meet the preferred specifications were selected. A 200 gm salt mixture comprising 24.5 weight percent of sodium chloride, 20.5 weight percent of potassium chloride, and 55.0 weight percent of magnesium chloride was prepared and was dried of water and hydrogen chloride. Subsequently the mixture was reheated in a thick-walled aluminum crucible. The variation of the temperature with time is shown in FIG. 1. During reheat, plateau "A" results from the melting of the salt mixture. After heat or power is cut off, the mixture cools. Plateau "B" results from freezing of the salt mixture.

EXAMPLE II

A 2262 gm sample of the same mixture and of the same specifications as Example I was prepared by the technique of Example I. The sample was placed in a 1152 gm thick-walled crucible and was heated electrically. The sample was heated with an applied power of 906.7 watts. FIG. 2 shows the variation of the sample temperature with time. The heat of fusion was calculated to be between 97 and 98 cal/gm.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A thermal energy-storage material which comprises a ternary salt mixture of sodium chloride, potassium chloride, and magnesium chloride in a $NaCl:KCl:MgCl_2$ weight ratio range of 22.5 to 26.5:18:5 to 22.5:53.0 to 57.0 and an additive salt selected from the class consisting of calcium, barium, strontium chloride, sodium, potassium, and magnesium bromide, sodium, potassium, and magnesium fluoride and mixtures thereof in an amount sufficient to reduce the melting point of said thermal energy-storage material below that of said ternary salt mixture and not to exceed 10 weight percent of the total composition.

2. The thermal-energy storage material of claim 1, wherein said additive salt is selected from the class consisting of calcium, barium and strontium chloride and mixtures thereof.

3. A method of storing thermal-energy which comprises transferring thermal energy to said thermal-energy storage material of claim 1.

4. A method for storing thermal energy which comprises transferring thermal energy to said thermal-energy storage material of claim 2.

* * * * *